(12) United States Patent
Lax et al.

(10) Patent No.: US 8,868,345 B2
(45) Date of Patent: Oct. 21, 2014

(54) METEOROLOGICAL MODELING ALONG AN AIRCRAFT TRAJECTORY

(75) Inventors: David Michael Lax, East Grand Rapids, MI (US); Frank Saggio, III, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 298 days.

(21) Appl. No.: 13/173,316

(22) Filed: Jun. 30, 2011

(65) Prior Publication Data

US 2013/0006533 A1     Jan. 3, 2013

(51) Int. Cl.
| | | |
|---|---|---|
| *G01W 1/00* | (2006.01) | |
| *H03F 1/26* | (2006.01) | |
| *G08G 5/00* | (2006.01) | |

(52) U.S. Cl.
CPC ............. *G08G 5/0091* (2013.01); *G01W 1/00* (2013.01)
USPC ............................................. 702/3; 702/189

(58) Field of Classification Search
CPC ..................................................... G01W 1/00
USPC ..................................................... 702/3, 189
See application file for complete search history.

(56) References Cited

U.S. PATENT DOCUMENTS

| | | | |
|---|---|---|---|
| 5,574,647 A | 11/1996 | Liden | |
| 6,266,610 B1 | 7/2001 | Schultz et al. | |
| 8,332,084 B1 * | 12/2012 | Bailey et al. | 701/10 |
| 2007/0179753 A1 * | 8/2007 | Barajas et al. | 702/189 |
| 2008/0255714 A1 | 10/2008 | Ross | |
| 2008/0319951 A1 * | 12/2008 | Ueno et al. | 707/3 |
| 2009/0037091 A1 | 2/2009 | Bolt, Jr. et al. | |
| 2009/0204277 A1 | 8/2009 | Coulmeau et al. | |
| 2010/0049382 A1 | 2/2010 | Akalinli et al. | |
| 2010/0076629 A1 | 3/2010 | Chaix et al. | |
| 2010/0152931 A1 | 6/2010 | Lacombe et al. | |
| 2010/0198433 A1 | 8/2010 | Fortier et al. | |
| 2011/0054718 A1 | 3/2011 | Bailey | |
| 2012/0191333 A1 * | 7/2012 | Sawhill et al. | 701/122 |
| 2012/0209459 A1 * | 8/2012 | Klooster | 701/18 |
| 2012/0209515 A1 * | 8/2012 | Klooster | 701/439 |

FOREIGN PATENT DOCUMENTS

| | | |
|---|---|---|
| EP | 1 717 553 A2 | 2/2006 |
| EP | 2290636 A1 | 3/2011 |
| WO | 2009/091329 A1 | 7/2009 |

OTHER PUBLICATIONS

Search Report and Written Opinion from corresponding European Application No. 12173947.8-2215, dated Jan. 3, 2013.

* cited by examiner

*Primary Examiner* — Michael Nghiem
*Assistant Examiner* — Eman Alkafawi
(74) *Attorney, Agent, or Firm* — McGarry Bair PC

(57) ABSTRACT

A method of providing approximate weather data points for an aircraft trajectory to a system, such as a flight management system (FMS), which is configured to accept a number of weather data points for the aircraft trajectory.

17 Claims, 4 Drawing Sheets

METEOROLOGICAL MODELING ALONG AN AIRCRAFT TRAJECTORY

BACKGROUND OF THE INVENTION

In a contemporary aircraft meteorological data at waypoints along an aircraft flight path may be considered for determining an estimated time of arrival and fuel burn during an aircraft's flight. For example, a flight management system (FMS) might consider wind velocity and temperature data uploaded to the FMS from a ground station via a communications system while the aircraft is in flight or input by the pilot. While the amount of the available meteorological data is large and may include multiple points along or near the aircraft flight path, there are practical limits to the real-time use of this large amount of data. For example, the FMS may be limited in the number of data points where weather data may be entered. Typically, flight path data is provided to the FMS as the start point, the end point, and perhaps one or a few enroute waypoints. Such limits in the data can limit the accuracy of FMS forecasts based on the data. Another practical limitation is the relatively high cost of transmitting the data to the aircraft, which is currently done by transmission over a subscription-based, proprietary communications system such as Airline Communications Addressing and Reporting System (ACARS).

BRIEF DESCRIPTION OF THE INVENTION

In one embodiment, a method of providing an approximate weather profile for an aircraft trajectory to a system configured to accept a number of weather data points for the aircraft trajectory includes receiving the aircraft trajectory, extracting weather forecast data points along the received trajectory from a weather forecast database to form a subset of weather forecast data points, generating an approximated weather profile of the subset of weather forecast data points comprising a set of approximated data points unconstrained to the subset of weather forecast data points and having fewer data points than the subset of weather forecast data points and no more than the number of weather data points acceptable by the system, and providing the approximated weather data points to the system.

DESCRIPTION OF EMBODIMENTS OF THE INVENTION

A flight path for an aircraft generally includes a climb, a cruise, and a descent. While described in the context of a full flight path from takeoff to landing, the invention is also applicable to all or any portion of the full flight path, including in-flight updates to an original flight path. For purposes of this description, the full flight path example will be used.

Most contemporary aircraft include a flight management system (FMS) for generating a flight path trajectory 10 and flying the aircraft along the flight path trajectory 10. The FMS may automatically generate the flight path trajectory 10 for the aircraft based on commands, waypoint data, and additional information such as weather data all of which may be received from an airline operations center or from the pilot. Such information may be sent to the aircraft using a communication link. The communication link may be any variety of communication mechanism including but not limited to packet radio and satellite uplink. By way of non-limiting example the Aircraft Communications Addressing and Reporting System (ACARS) is a digital datalink system for transmission messages between aircraft and ground stations via radio or satellite. The information may also be input by the pilot.

Figure 1:
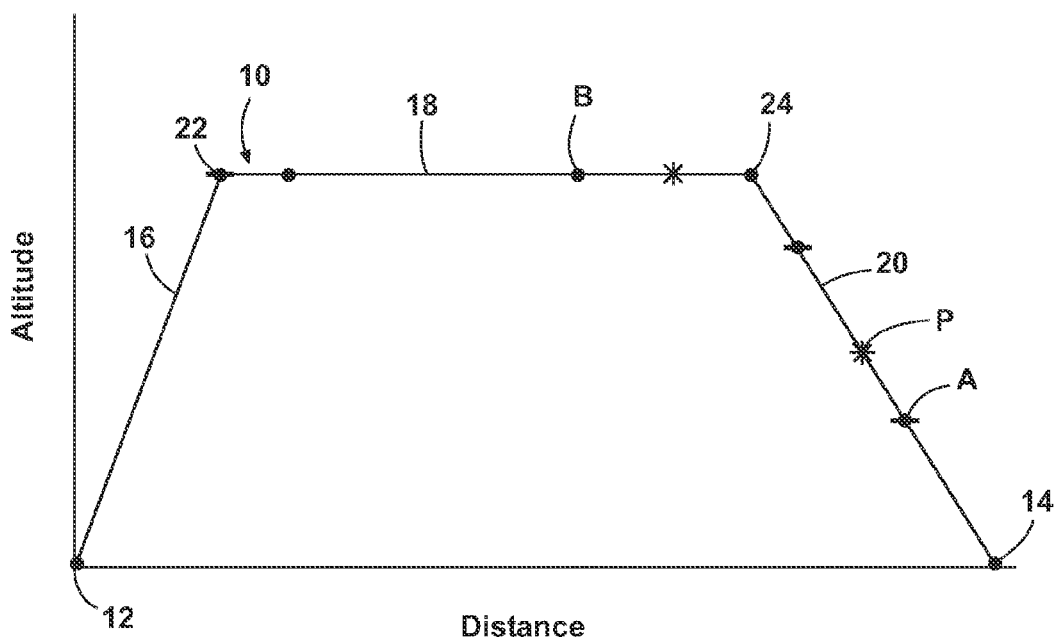
FIG. 1 is a schematic graphical illustration of an aircraft trajectory for implementing a flight path for an aircraft.

FIG. 1 is a schematic illustration of a flight path for an aircraft in the form of an aircraft trajectory 10. The trajectory begins at a trajectory start point 12, such as the departure airport, and ends at a trajectory end point 14, such as a destination airport. Traversing between the start point 12 and end point 14 includes a climb phase 16, a cruise phase 18, and a descent phase 20, which are all included in the trajectory 10.

The climb, cruise and descent phases are normally input into an FMS as data points. For purposes of this description, the term data point may include any type of data point including waypoints, enroute waypoints, and altitudes and is not limited to a specific geographic position. For example, the data point may just be an altitude or it may be a specific geographic location, which may be represented by any coordinate system, such as longitude and latitude. By way of non-limiting example a data point may be 3-D or 4-D; a four dimensional description of the aircraft trajectory 10 defines where in 3D space the aircraft is at any given point of time. Each of the data points may include associated information, such as weather data that may include temperature data and wind data, with or without wind direction.

For the climb phase 16 a data point corresponding to the altitude A at the top of the climb 22 may be input, for the cruise phase 18 enroute waypoints B may be input; and for the descent phase 20 various altitudes may be input. After takeoff, an aircraft typically remains in the climb phase 16 up to the top of climb 22 and then it follows the enroute waypoints during the cruise phase 18 to the top of the descent 24 where it then starts the descent phase 20. The altitudes A in the climb phase 16 and the descent phase 20 are waypoints in the sense that the aircraft is achieving its trajectory 10 to such altitudes during these phases. The enroute waypoints B may be selected based upon the location of ground navigation aids (Navaids) along the trajectory 10 of the aircraft. It may be understood that during the cruise phase 18 there may be some changes in altitude especially for transcontinental flights where an aircraft may change it elevation to take advantage of or minimize the impact of prevailing winds, such as the jet stream, to climb to higher altitudes as fuel is burned, or to avoid turbulence.

Pseudo-waypoints P may also be included in the trajectory 10 and are artificial reference points created for some purpose relevant to a parameter of the trajectory 10 and are not limited to ground navigation aids. They can be defined prior to or after established data points for the trajectory have been set. Pseudo-waypoints can be defined in various ways, such as by latitude and longitude or by a specified distance along the current trajectory, such as an along-track waypoint.

Weather data, such as wind and temperatures aloft, may be entered for any of the data points. Such weather data improves FMS flight predictions. The weather data may be obtained from a weather data base which may contain real-time weather data or forecasted weather data. Such weather databases may contain data regarding certain weather-related phenomena (e.g., wind speed, wind direction, temperature, among others) and data pertaining to visibility (e.g., foggy, cloudy, etc.), precipitation (rain, hail, snow, freezing rain, etc.) and other meteorological information. Because air temperature and wind must be accounted for in trajectory calculations to ensure that the aircraft can accurately conform to the desired trajectory, the weather database may include 3-D real-time temperature and wind models of the local airspace as well as 4-D forecasted data. The weather database may store such real-time or forecasted weather data at a specific latitude, longitude, and altitude.

While it is typically most accurate to use weather data from a data point from the weather database corresponding to the desired data point on the trajectory, not every latitude, longitude and altitude may be accounted for in the database and there may be a finer resolution of weather data for points over land in the United States and Europe, for example, weather data every 2 km, and a reduced resolution for points over the Atlantic Ocean.

Each data point of the weather database does not necessarily lie on the trajectory 10. When the weather database does not have a data point that corresponds to the data point on the trajectory, the available weather data may be interpolated to obtain weather data lying on the trajectory and the interpolated weather data may be entered into the FMS. Alternatively, the weather data from the closest weather data point for the data point on the trajectory may be entered into the FMS.

It is important to have accurate weather data because close representation of weather profiles in the vicinity of an aircraft's trajectory will produce more accurate FMS predictions, thereby resulting in improved estimations of aircraft fuel usage and arrival time. The more weather data used to prepare the weather profiles will typically result in a more accurate weather profile as will the more up-to-date is the weather data.

However, the ability to submit all relevant weather data from the weather database to the FMS from a ground station may be limited by the FMS itself as the FMS typically limits the number of data points on the flight trajectory for which weather data may be entered and ultimately used in the trajectory prediction. In many FMS, the total number of permitted data points is less than 10 while the weather database may have hundreds of relevant data points for the trajectory. Thus, providing accurate weather data may be a challenge because the FMS has a limited number of data points it may receive.

Further, the timeliness of the weather data may be limited because communication link from the ground to the aircraft may have a limited bandwidth available for transmitting extensive weather data related to the flight trajectory of the aircraft, and, in any event, it may be costly to communicate large amounts of digital data to the aircraft. Most current systems are subscription-based, which have relatively high associated fees for data transmission. By way of non-limiting example, there is currently a charge per character or byte sent over ACARS. Thus, the amount of weather data sent to the aircraft may also be prohibited based on bandwidth and cost. Therefore, the cost of communicating up-to-date weather data to the FMS is also a practical limitation. The lack of up-to-date weather data becomes more of an issue as the duration of the flight increases.

The limit on data points that may be entered into the FMS, the cost of sending data real-time to the aircraft, and the lack of actual weather data along the flight plan place practical limitations on the accuracy of weather data being used in the FMS and the real-time updating of the weather data. The invention addresses the accuracy of the weather data associated with these practical limitations by providing an approximated weather profile suitable for the FMS based on data from the weather database, but the profile is not limited to the actual weather data in the weather database. The approximated weather profile may include artificial data such that the weather profile when used by the FMS will more accurately represent the actual weather data rather than if only a few data points from the weather database are used.

An embodiment of the inventive method computes and sends an approximated set of weather data points to the FMS. The approximated weather data points may be selected such that a weather profile generated from the approximated weather data points closely matches an actual weather profile generated from the full weather database, and may be for one or more of the phases of the flight plan, or portions of a phase of the flight plan. Such approximated weather data points are practically limited by the number of data points that may be input into the FMS. To obtain a more accurate weather profile, one, more, or all of the approximated weather data points may contain artificially created weather data that is not the same as the corresponding actual weather data for a specific geographic location in the weather database and/or one, more or all of the approximated weather data points may not lie on the flight path.

Figure 2:
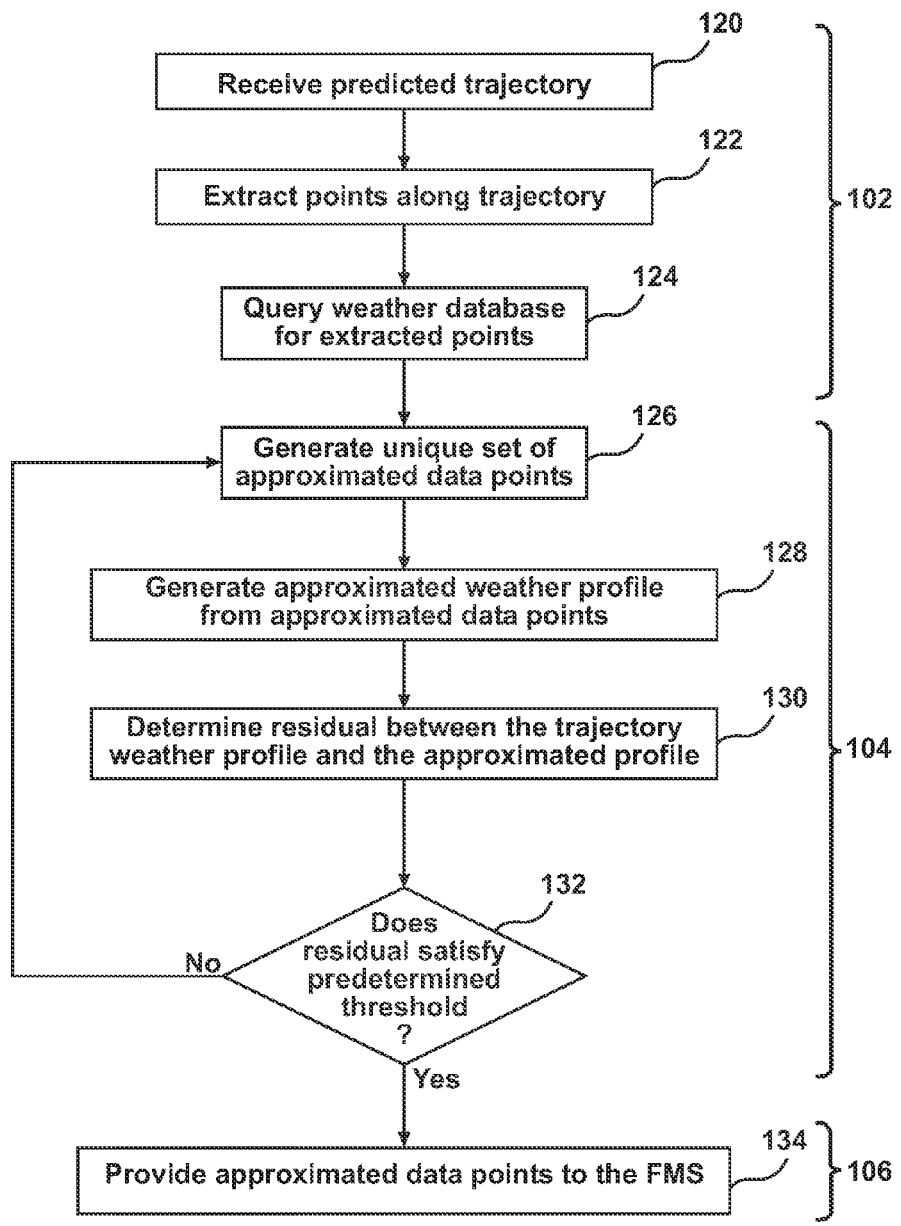
FIG. 2 is a flow chart of a method according to one embodiment of the invention.

In accordance with an embodiment of the invention, FIG. 2 illustrates a method 100 of providing such approximated weather data points for an aircraft trajectory to the FMS. The sequence of steps depicted is for illustrative purposes only, and is not meant to limit the method 100 in any way as it is understood that the steps may proceed in a different logical order or additional or intervening steps may be included without detracting from the invention. The method 100 generally includes weather data collection at 102, a computation of an approximated weather data points and approximated weather profile at 104, and output of the approximated weather data points at 106. It is contemplated that such method 100 may be carried out in a system on the ground and that the relevant output may be sent to the FMS of the aircraft via a communication link.

The method 100 begins with receiving the predicted aircraft trajectory at 120. This may include receiving start and endpoint as well as waypoints, which define the trajectory. The trajectory may be predicted by the FMS on the aircraft and down-linked to the ground system, or it may be generated by a separate ground-based trajectory prediction system. It is contemplated that the trajectory may be 4-Dimensional (latitude, longitude, altitude and time), a 3D trajectory (excluding time), or a 2D trajectory (latitude and longitude only). At 122 the trajectory is processed and various points along the trajectory are extracted.

The weather forecast database is then queried at 124 for the points extracted along the trajectory to form a subset of weather forecast data points. The weather forecast data should be in 3D or 4D formats in the region of the trajectory corresponding to the 3D or 4D trajectory used. In this manner, weather forecast data points may be extracted along the received trajectory from a weather forecast database to form a subset of weather forecast data points. Such weather data points may include weather data points associated with the data points. The weather data points may be associated with the data points when a weather data point is within a predetermined geographical distance from the data point. By way of non-limiting example, the weather data point extracted for a specific data point may be within 2-5 kilometers of the location of the data point. The weather forecast data points may include at least one of: wind speed, wind direction, air temperature, humidity, and barometric pressure data elements.

The method 100 continues with computing approximated data points and generating an approximated profile at 104 from the approximated data points, which may include a curve fitting routine to generate an approximated weather profile. It is contemplated that generating the approximated weather profile may include generating a unique set of approximated data points at 126, generating an approximated profile from the unique set of approximated data points at 128, determining the residual between the weather forecast curve and the approximated curve at 130, and then determining if the residual satisfies a predetermined threshold at 132, and repeating the generation of the approximated weather profile until the residual satisfies the predetermined threshold.

More specifically, a set of approximated weather points unconstrained from the subset of weather forecast data points may be determined at 126. It is contemplated that a limited set of weather data or a set of approximated data points may be calculated for each phase of flight (climb 16, cruise 18, and descent 20) and that points for the entire trajectory may be computed at 104 or that each phase may be computed independently at 104. The approximated weather data points may be interpolated from actual weather data points either on or off of the trajectory. Any appropriate interpolation method may be used.

The set of approximated data points determined at 126 may then be used to form an approximated weather profile at 128. Generating the approximated weather profile may include generating a curve from the generated approximated data points. At 130, a statistical measure of the residual between the subset of weather forecast data points and the approximated weather profile is determined. At 132, it is then determined if the residual satisfies a predetermined threshold to determine if the approximated weather data points and associated weather profile meet criteria to limit the residual between the subset of weather forecast data points and the approximated weather profile. If the residual measure is below the threshold, the method may continue. If the residual measure is above the threshold, then the method generates a new unique set of approximated data points at 126 and the method continues until the residuals are acceptable.

Essentially, during the computing of the approximated data points and approximated profile at 104 a curve-fitting function mathematically solves for weather values which minimize the residuals between the subset of weather forecast data points generated at 124 and the approximated weather profile generated at 128. It will be understood that the subset of weather forecast data points generated at 124 has a much high resolution than the data points used to generate the approximated weather profile at 128. It is contemplated that the data along the entire trajectory may be curve-fit at once or that the curve-fitting function may be used between any two fixed locations, such as top of descent and landing, two waypoints, or top of climb and top of descent as a whole. It is contemplated that a least squares solver or other curve-fitting technique may be used to minimize the residuals between the two. The threshold may be experimentally determined and it is contemplated that a user may fine tune the predetermined threshold for the approximated profile to suit their needs. For instance, in a shorter flight, it may be acceptable to have larger errors because the errors are not propagated for as much time as they would in a longer flight.

During the computing of the approximated data points and approximated profile at 104 other weather based or trajectory based error parameters, for instance residual and gradient, performance parameters, or delta time of flight between waypoints could be used to determine the approximated data points. Other termination criteria, aside from the residuals used in curve fitting, may be assessed to determine if the approximated data points and approximated weather profile should be output. The threshold could also be defined as a performance metric or user defined parameter. It has been contemplated that the generation of the new unique set of approximated data points may include one or more new approximated weather data points and that the number of approximated data points used may stay the same.

Alternatively, the new unique set may include one or more additional approximated weather data points in addition to those previously used. The addition of approximated weather data points may be limited by user defined criteria relating to the number of data points that the FMS may accept. For example, the residual used in curve fitting will then be recomputed using the new set of locations and the process is repeated until either the residual measure is below the threshold, or the user defined maximum number of additional points is met.

Further, if multiple weather data information, such as both wind and temperature are desired, the computing of the weather data points at 104 may be implemented for multi-variable solutions by repeating the curve-fitting process for each variable if the selected locations for each weather parameter are the same. In one implementation, the computing of the limited set of weather data at 104 may be called twice per iteration; once for wind, and once for temperature. In each case, the method may solve for the value of weather data at each selected location. By separating wind from temperature, different locations may be chosen for each parameter, if this is not required, they could be computed simultaneously At 134, the set of approximated data points or approximated weather profile may be processed and output to the FMS. It is contemplated that the information may be reformatted into a format required by the user, and that such reformatted information may be output at 134. For example, internal calculations used in the method 100 may use distance travelled as the weather location coordinate, but the FMS receiving the information my require weather inputs at specific latitude/longitude locations. Thus, it is contemplated that the method 100 may include a conversion between data representations to output the information in the proper format for the FMS.

The output may include sets for each phase of the flight being output to the FMS. It is contemplated that the generating of the approximated weather profile is conducted at a ground station and wirelessly transmitted to the FMS on board the aircraft via a communication link at 134. It is contemplated that the approximated weather profile may be transmitted to the aircraft while it is in flight or on the ground. Thus, the data sent to the FMS may include limited meteorological data which may best represent the weather which will be encountered during the remainder of the flight of the aircraft.

It is also contemplated that a trajectory weather profile may be generated for the weather forecast along the aircraft trajectory from the subset of weather forecast data points. Generating the trajectory weather profile may include generating a weather forecast curve from the weather forecast data points. This may include forming a continuous weather profile curve. The formation of the weather profile curve may include interpolating the associated weather data points to points lying directly on the trajectory. Any suitable curve-fitting method may be used. In such a case it may be understood that a residual between the weather profile curve and the approximated curve may be determined at 130, and then the method may continue on with determining if the residual satisfies a predetermined threshold at 132, and so on as described above.

Figure 3:
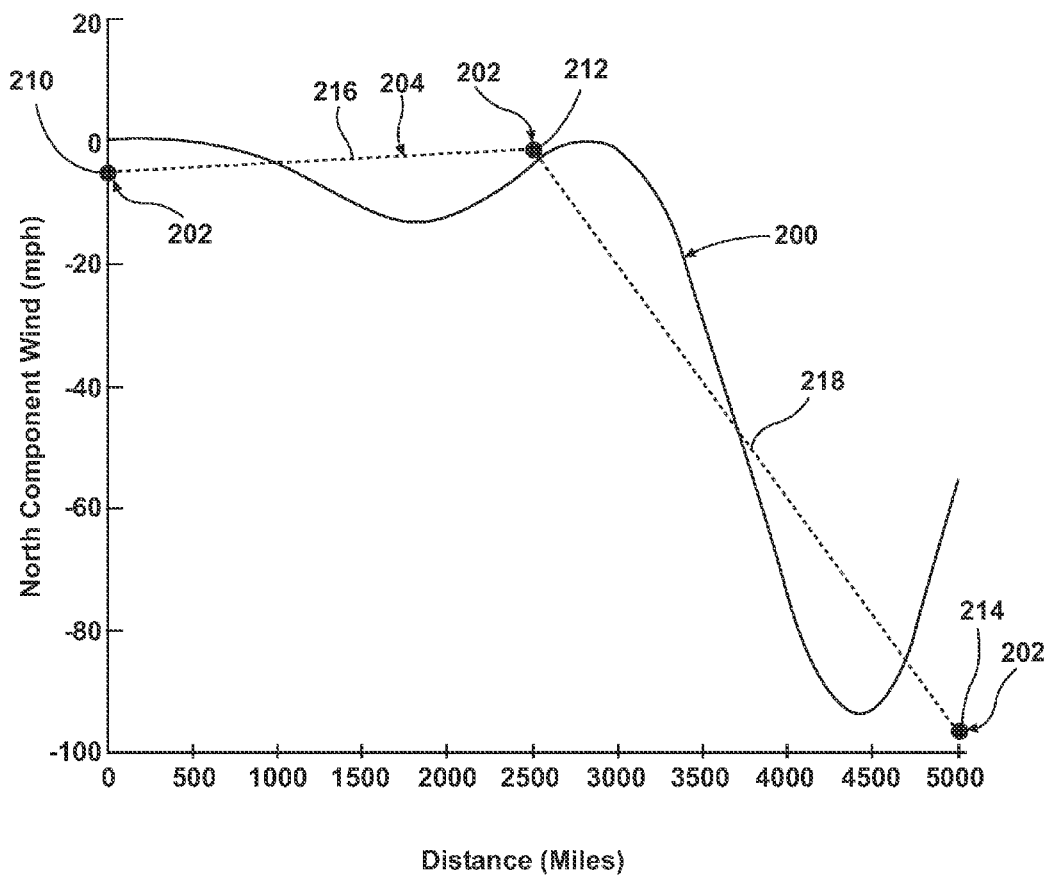
FIG. 3 is a graphical illustration of results of the method according to the flow chart in FIG. 2

FIG. 3 graphically illustrates an example of the results of the inventive method. More specifically, a subset of weather forecast data points 200 is shown along the trajectory as well as a set of computed approximated data points 202 and the resulting approximated weather profile 204 using a piecewise curve fit. It may be understood that the resolution of weather data is so high in the subset of weather forecast data points 200 that the points may appear to form a continuous line. The set of computed approximated data points 202 includes points 210, 212, and 214, which represent wind velocity data at the three approximated data points. As illustrated, the approximated data points 202 lie off the subset of weather forecast data points 200 and are selected by the method 100 to provide an approximated weather profile 204 having the least residual from the subset of weather forecast data points 200 while being constrained by the fact that the set of data points contains no more than the predetermined number of weather data points allowed by the FMS, yet being unconstrained as to include actual weather data. The weather data may be interpolated, such as by using a piece-wise curve fit, between each of these points 210, 212, and 214 to generate the approximated weather profile 204. The approximated weather profile 204 comprises a first interpolated segment of weather data 216 between points 210 and 212 and a second interpolated segment of weather data 218 between points 212 and 214.

Figure 4:
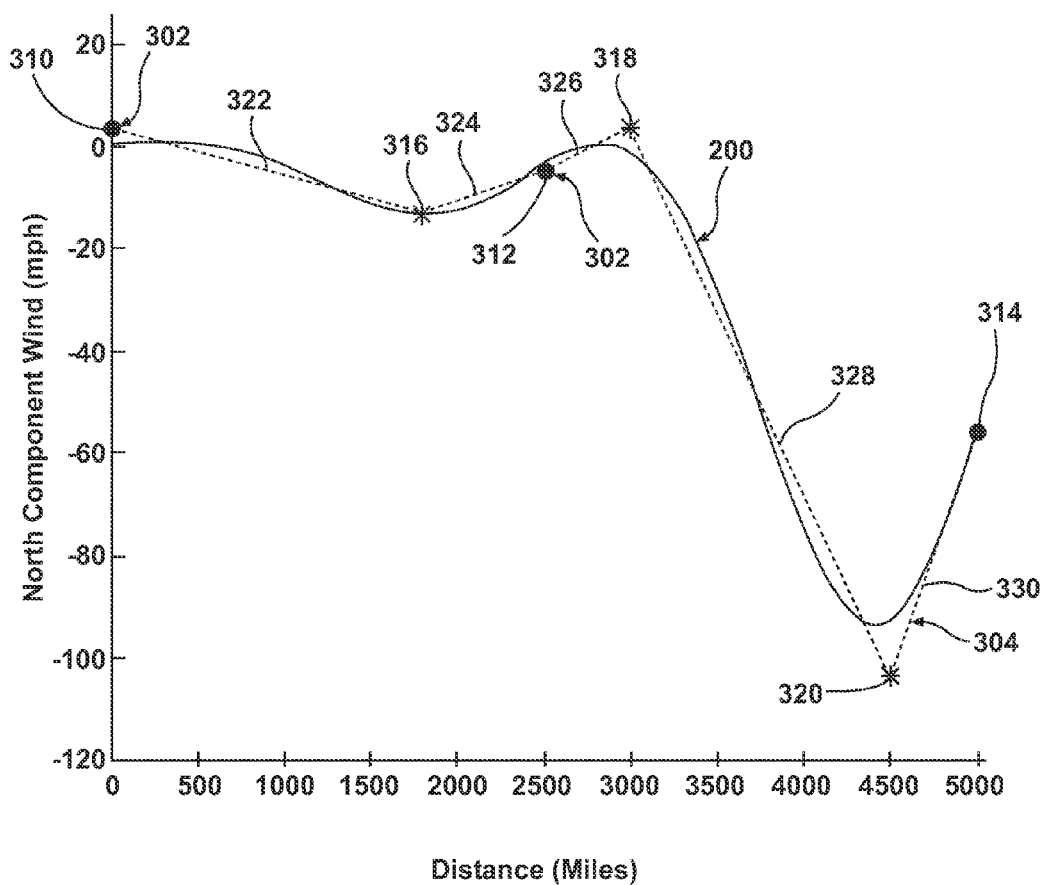
FIG. 4 is a graphical illustration of results of a method according to a second embodiment of the invention.

There may be some question about the accuracy of the approximated weather profile 204 through each interpolated segment 216 and 218 and thus it is contemplated that the inventive method may include various modifications to ensure that the weather data sent to the FMS at 134 has the least residual amount possible. FIG. 4, by way of non-limiting example, graphically illustrates some of the modifications, which may be used to obtain an approximated weather profile 304 having less residual when compared with the same subset of weather forecast data points 200.

First, three alternative approximated weather data points 302, which include points 310, 312, and 314, have been illustrated. To lessen the residual the weather data point 314 correlating to an endpoint of the trajectory 10 has been prescribed as the weather forecast data or true weather at that location. One way to specify locations is by altitude in climb and descent, and by distance in cruise. It is contemplated that prescribing the values at the endpoints of each phase also achieves the advantage that no discontinuities are created in the data between phases of flight. This may be especially useful when weather along the entire flight is optimized by phase and may be unnecessary where the weather along the entire trajectory is determined at once. This is because by combining the phases, the resulting wind profile is guaranteed to be piecewise continuous, and there would no longer be reason to prescribe the endpoint values.

To further limit the residual between the approximated weather profile 304 and the subset of weather forecast data points 200 pseudo-points, which have been illustrated as including additional approximated weather data points at 316, 318, and 320 may be added to the unique approximated data point set. It is also contemplated that the inventive method may include providing interpolated weather forecast data for the pseudo-points. Such interpolated weather data may be derived from the weather forecast data points around the pseudo-point. Alternatively, it is contemplated that actual weather forecast data may be used for such pseudo-points.

In effect, for the approximated weather profile 304 with pseudo-waypoints 316, 318, and 320, the interpolation between points is conducted over shorter distances with interpolation segments 322, 324, 326, 328, and 330. The approximated weather profile 304 having such pseudo-points may result in greater accuracy than the approximated weather profile without pseudo-points because smaller residual error may be achieved by interpolating over shorter distances with additional pseudo-points.

The pseudo-point locations may be selected using several different methods. A simple choice would be to use the location with the highest value of residual, subject to constraints such as a minimum distance from any other point in the set. Another option is to find the segment, between two locations in approximated data points, which has the highest average or total residual and select the midpoint of this segment. The location could also be selected based on the rate of change in gradient of the full wind profile. Other options could calculate performance measures or secondary aircraft predictions using the approximated weather profile versus the subset of weather forecast data points and select the pseudo-point location with the largest difference. Typical parameters of interest to use in such a comparison may include at least one of time of arrival at a certain point of the trajectory, fuel used, distance travelled by phase, groundspeed, and required engine thrust level. Further, it is contemplated that heuristic rules such as weighting or prioritization of certain locations or location types may be used.

It is also contemplated that the method allows for user constraints, such as maximum number or locations of weather entries in any particular phase of the trajectory 10 or the trajectory 10 as a whole. The above method may also take into account the user constraints and will optimize the approximated data points for a given set of user constraints. It is contemplated that a data point threshold may be set that defines the maximum number of data points that can be sent to the FMS. Such threshold may be a system limited threshold or may be a user defined threshold. By way of non-limiting example, a FMS system may have a predetermined data point threshold of five weather data points; thus, a data point threshold may be set by the system to limit the amount of approximated weather data points. A user may set a limit less than the amount of data points the FMS may accept for cost reasons. Thus, during the method 100 it may be determined if the number of approximated weather data points is greater than the predetermined data point threshold. In an effort to obtain a residual below the predetermined threshold there may be a number of pseudo-points defined that exceed a maximum point threshold. This may especially be true if the cruise phase is relatively long. In such a case, the method 100 may automatically increase the predetermined threshold and rerun elements 126 to 132 or the method 100 may simply select the pseudo-point locations to minimize residual error. In this manner, pseudo-points may be inserted at points where there is greatest impact in reducing errors resulting from creating an approximated weather profile by interpolating with too few approximated data points.

The above described invention processes a large-scale weather forecast and computes reduced data to be provided to the FMS and such reduced data provides a closer representation of weather profiles in the vicinity of the aircraft's trajectory. The invention takes into account that many FMSs have limited memory available to store this data and can receive only a limited number of elements for use in the trajectory prediction. The approximated data points are chosen to minimize the residuals between subset of weather forecast data points and the approximated weather profile while simultaneously minimizing the number of approximated data points in order to minimize the communication requirements required to output the approximated information to the FMS and to remain within any user constraints. Such closer representation of weather profiles in the vicinity of an aircraft's trajectory will produce more accurate FMS predictions and will thereby result in improved estimations of aircraft fuel usage and arrival time. Further, the invention includes very little iteration and each iteration is a self-contained optimization step. Lengthy trajectory predictions are not required for the computation of the approximated data points and the aircraft trajectory is only computed once as an input to the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of providing an approximate weather profile for an aircraft trajectory to a system configured to accept a number of weather data points for the aircraft trajectory, the method comprising:
   receiving the aircraft trajectory;
   extracting, by a processor, weather forecast data points along the received trajectory from a weather forecast database to form a subset of weather forecast data points;
   generating, by the processor, an approximated weather profile comprising a set of approximated data points unconstrained to the subset of weather forecast data points, where the approximated weather profile is fit to the subset of weather forecast data points and the set of approximated data points has fewer data points than the subset of weather forecast data points and no more than the number of weather data points the system is configured to accept, wherein generating the approximated weather profile comprises:
   a) generating, by the processor, a unique set of approximated data points;
   b) generating, by the processor, an approximated curve from the unique set of approximated data points;
   c) determining, by the processor, a residual between the subset of weather forecast data points and the approximated curve; and
   d) repeating a-d until the residual satisfies a predetermined threshold; and
   providing, by the processor, the set of approximated data points to the system.

2. The method of claim 1 wherein the receiving the aircraft trajectory comprises receiving waypoints defining the trajectory.

3. The method of claim 2 wherein approximated data points are provided for at least some of the waypoints.

4. The method of claim 3 wherein the waypoints comprise endpoints and the approximated data points are provided for at least the waypoints other than the endpoints.

5. The method of claim 4 wherein the weather forecast data points are provided for the endpoints.

6. The method of claim 2 wherein the extracting weather data points comprises extracting weather data points associated with the waypoints.

7. The method of claim 1, further comprising providing interpolated weather forecast data points on the aircraft trajectory from the weather forecast data points not lying on the aircraft trajectory.

8. The method of claim 1 wherein at least one of the generated approximated data points lies off the subset of weather forecast data points.

9. The method of claim 1 wherein the curve is a piece-wise linear approximation based on the approximated data points.

10. The method of claim 1 wherein the aircraft trajectory comprises multiple phases and the approximated weather profile is generated for at least one of the phases.

11. The method of claim 10 wherein the multiple phases comprises at least one of a climbing phase, cruising phase, and descent phase.

12. The method of claim 1 wherein the weather forecast data points comprises at least one of: wind speed, wind direction, and air temperature.

13. The method of claim 1 wherein the system is a flight management system (FMS) configured to accept a predetermined number of weather data points for the aircraft trajectory.

14. The method of claim 13 wherein the generating of the approximated weather profile is conducted at a ground station and wirelessly transmitted to the FMS.

15. The method of claim 1, further comprising generating a trajectory weather profile for the weather forecast along the aircraft trajectory from the subset of weather forecast data points.

16. The method of claim 15 wherein generating the trajectory weather profile comprises generating a weather forecast curve from the weather forecast data points.

17. The method of claim 16 wherein the determining the residual between the subset of weather forecast data points and the approximated curve comprises determining a residual between the weather forecast curve and the approximated curve.

* * * * *